UNITED STATES PATENT OFFICE.

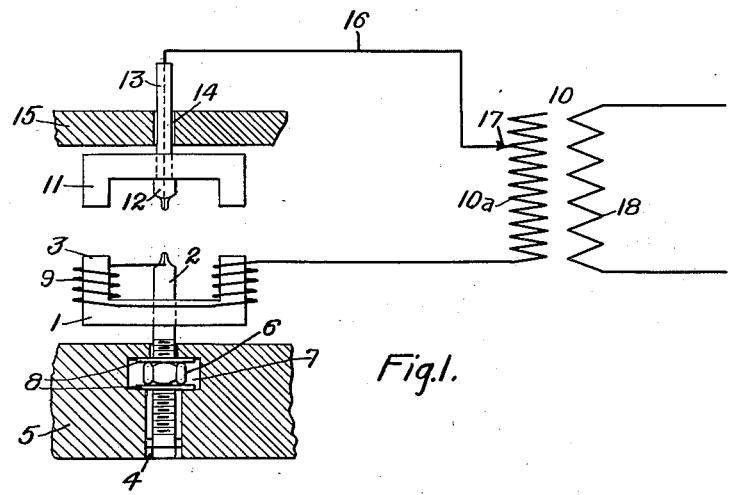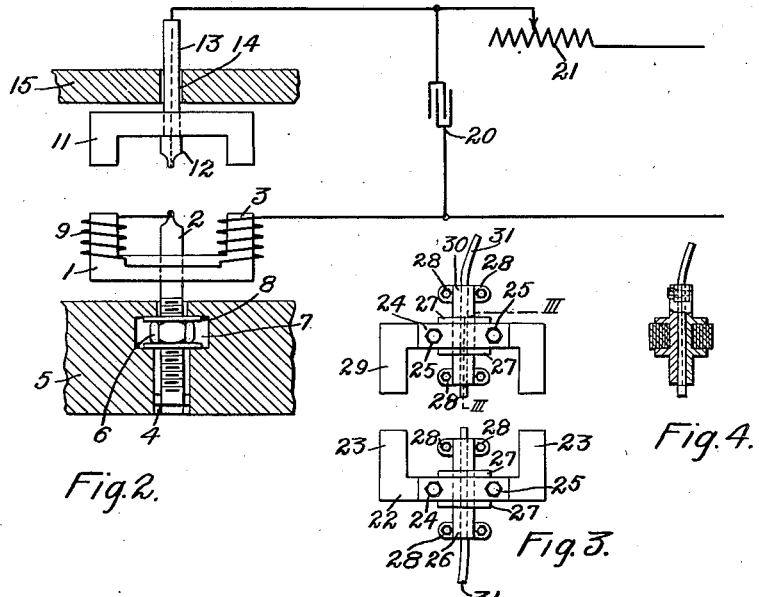

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

METHOD OF AND APPARATUS FOR SPOT-WELDING.

1,327,814.　　　　Specification of Letters Patent.　　Patented Jan. 13, 1920.

Application filed March 7, 1919. Serial No. 281,168.

*To all whom it may concern:*

Be it known that I, CHARLES LE G. FORTESCUE, a subject of the King of Great Britan, and a resident of Pittsburgh, in the county of Allegheny and State of Pennsylvania, have invented a new and useful Improvement in Methods of and Apparatus for Spot-Welding, of which the following is a specification.

My invention relates to methods of and apparatus for spot-welding and it has, for its primary object, the provision of apparatus by means of which articles may be electrically welded together and by the use of which the welding current shall produce an electromagnetic force to compress the articles when in a heated condition.

The advantages obtained in the use of spot-welding apparatus are generally well known. The efficiency and simplicity of such apparatus insure exceptionally good results in securing metal articles together, even when the operation is performed by comparatively unskilled labor. However, the apparatus heretofore employed necessitated a certain degree of skill in applying the compressive force necessary to secure the articles together because the pressure was applied by some mechanical means which necessitated the exercise of judgment as to when it should be applied. Another disadvantage of depending entirely upon a mechanical force for compression in spot-welding resides in the massiveness of such apparatus. The weight and bulk of such apparatus makes difficult the ready movement of it to work which cannot be readily done in a shop.

One object of my invention resides, therefore, in providing apparatus for spot-welding in which the electric current employed for heating the metal members to be united may also be employed to automatically compress the metals at the point of junction.

Another object of my invention is to provide a method of welding which shall permit of the employment of apparatus of relatively light weight and compact structure.

With these and other objects in view, my invention will be more fully described, illustrated in the drawings, in the several views of which corresponding numerals indicate like parts, and then particularly pointed out in the claims.

In the drawings, Figure 1 is a side elevation of a device constructed in accordance with my invention; Fig. 2 is a similar view which illustrates a modified form of electrical control for the apparatus shown in Fig. 1; Fig. 3 is a side elevation of a plurality of magnet members and electrodes suitable for welding wires in accordance with my invention, and Fig. 4 is a sectional view taken substantially along the line III—III of Fig. 3.

The broad object of my invention is to employ electric current for heating a plurality of metal members which it is desired to unite by spot-welding and to further employ this current to produce a magnetic action for effecting the desired compression of the metal members between the welding electrodes. I have discovered that, by employing the heating current to produce the compressive action between the metal members which it is desired to unite, an exceptionally strong and uniform joint may be obtained. The percussive action brought about by the electromagnetic force unites the metals at the right time without the necessity of skilled judgment as to when the pressure should be applied.

I may provide an apparatus for spot-welding by employing an electromagnet having a welding electrode preferably disposed at the central portion of the magnet and projecting beyond the body portion thereof. A magnetizable member, also provided with a welding electrode similarly disposed, may be employed to coöperate with the electromagnet to provide the compressive action upon metallic members disposed between the magnet and the magnetizable member.

One end of the coil of the magnet may be connected to a source of electric current and the other end may be connected to the welding electrode thereof. The welding electrode of the magnetizable member may also be connected to the source of electric current and, when the magnetizable member is disposed upon a plurality of metallic members, which are preferably placed upon the electromagnet and, therefore, in contact with the welding electrode thereof, a closed circuit is established between the welding electrodes. When current is supplied to the circuit the magnet immediately exerts an attractive force upon the magnetizable member and causes the electrode thereof to compress the metal engaging it, which is, at the same time, heated by the electric current. The metallic members, being subjected to the heating action of the electric current, as well as the compressive action of the electrodes, are united at the spot engaged by the electrodes.

In order to insure an accurate understanding of my invention, I have shown, in Fig. 1, a device, which may be employed in spot-welding, comprising a metallic member 1 of U-shape which may have an electrode or pin 2 secured substantially in its center between its end portions 3. The pin 2 may preferably be tapered or of smaller diameter at its working end, and the other end may be threaded. The member 1 may be adjustably supported by disposing the threaded end of the pin or electrode 2 in an opening 4 provided in a base 5 and may be screwed through a nut 6 disposed in an enlarged chamber 7. Washers 8 may be provided to engage the nut 6 and the upper and lower walls of the chamber 7. By supporting the member 1 in such manner, it may be raised or lowered, as desired, by turning the nut upon the pin or electrode 2.

The end portions 3 of the member 1 may be provided with series-connected coils 9, the outer terminals of which may be respectively connected to the electrode 2 and to the secondary winding 10ª of a transformer 10. A magnetizable member 11, preferably corresponding in shape to the member 1, may be employed which also has an electrode 12 disposed at its central portion, the shank 13 of which may be extended through an opening 14 in a guide member 15 to maintain the member 11 in such position that its end portions may always be alined with the corresponding end portions of the member 1 and will, therefore, maintain the electrodes in alined relation. The electrode 12 of the magnetizable member 11 may be connected, through a lead 16 and an adjustable contact or tap 17, to the secondary winding of the transformer 10. The primary winding 18 of the transformer 10 may be connected to a source of alternating current, not shown, through any desirable switch-mechanism, to open and close the circuit thereof.

In welding a plurality of metallic members by means of the device above described, the members may be so disposed upon the adjustably supported member 1 as to engage the electrode 2 at the spot where it is desired to join the metals. The magnetizable member 11 may then be disposed upon the metallic members and, being held in alined relation to the member 1, the electrode 12 thereof will be directly above the electrode 2.

An alternating current may then be applied to the primary winding 18 of the transformer 10, thus closing a circuit through the coils 9 of the member 1 and the electrodes of the respective members. The coils, being energized by the current, establish a magnetic force which draws the magnetizable member 11 toward the member 1.

When the current is first applied to the circuit, which is closed through the electrodes and the metallic members between them, it causes heating of the ends of the electrodes and of the metallic members. On account of the attractive force exerted by the electromagnet, the heated metal between the electrodes is compressed and securely united.

The pull exerted by the electromagnet may be regulated to any desired degree of strength. Furthermore, the pull, which is exerted by the magnet, steadily increases, as the metals are drawn into closer engagement, on account of the reduced resistance between the electrodes and the metallic members between them. The resistance, of course, increases slightly when the metal is heated but the greater resistance is occasioned by the poor contact between the members when first disposed between the electrodes, such contact becoming better as the metal is heated and compressed.

In Fig. 2 is shown a device that differs from that shown in Fig. 1 only as regards the control circuit for the magnet and the magnetizable member. In this instance, a direct current may be employed, and a condenser 20 may be connected in parallel with the electrodes of the respective members of the welding device. A variable resistance 21 may also be employed which is preferably connected in series with the electrode 12 of the magnetizable member 11.

In operating the device with such a control circuit, the metallic members may be placed between the electrodes, as above described, and a uni-directional current may be supplied to the latter. The electromagnetic action will take place in this instance the same as with the alternating current. By employing a condenser, a discharge may be utilized to exert a sudden impulse to move the movable electrode percussively into engagement with the work. This has been found, in some instances, to provide a better joint between certain metals than the steady pull which would be exerted by an alternating current and a control circuit as above described. The capacity of the condenser may be so selected as to secure any desired degree of strength in the pull exerted by the magnet to draw the electrodes together.

In Fig. 3 is shown a modified form of magnet members and electrodes therefor which may be employed in butt-welding electric conductors or similar articles. As here shown, a member 22, corresponding to the member 1 in the previous figures, has end portions 23 about which an electric conductor may be wound. The intermediate portion of the member 22 is provided with a removable member 24 which is secured in place by bolts 25. An opening may be provided in the member 22 adapted to receive a two-part electrode member 26 which has projecting shoulders 27 and clamping flanges 28. A duplicate of the member 22 may be employed as the magnetizable member 29 which may have a corresponding electrode 30.

A plurality of wires 31 may be clamped between the separable members of the two-part electrodes 26 and 30, after which the electrodes may be secured within the openings in the members 22 and 29 by securing the members 24 in place. The wires are then in a suitable position for being welded. A control circuit, such as is shown in Fig. 2, is preferably employed in this case. The coils 9 are disposed upon the end portions 23 of the member 22, and the remainder of the circuit may be established as shown in Fig. 2. The wires may be welded by dropping the magnetizable member 29 upon the member 22 so that the ends of the wires 31 shall meet with some degree of force which may be supplemented by a magnetic force produced by a discharge from the condenser 20.

It should be noted that the impact of the wires is not entirely caused by a mechanical force but is caused partially by the pull exerted upon the magnetizable member 29. The compressive force may be obtained by the magnetic force only but it is preferably secured by a combined mechanical and electrical force. Furthermore, the condenser discharge supplies a sufficient current to heat the wires at the point of engagement and, consequently, a welding of the wires results when they are forced together.

By thus employing a combined mechanical and electrical force to obtain a percussive engagement between a plurality of wires, a greater range of usefulness may be obtained for the welder. For example, in order to percussively weld two wires by dropping one upon the other, the guide members for the member carrying the movable electrode would have to be of too great length to obtain sufficient force when wires of comparatively large diameter were to be joined. In the device above described, a condenser of suitable capacity may be employed to facilitate joining wires or conductors of considerable diameter without increasing the bulk of the apparatus. Furthermore, the force exerted electrically may be prolonged sufficiently to insure good fusion and, consequently, a strong joint. The duration of the electrical force may be prolonged by maintaining a current in the welding circuit after the condenser has been discharged, and the resulting force may be controlled by varying the effective value of the variable resistance.

Although I have described a device and modifications thereof constructed and employed in accordance with my invention, it is obvious that my invention is not limited to any specific structure and I desire, therefore, that no limitations shall be imposed except such as are indicated in the appended claims.

I claim as my invention:

1. An electro-percussive welder comprising a plurality of electrode members and means tending to automatically force the members into engagement.

2. An electro-percussive welder comprising a plurality of electrode members and electro-magnetic means tending to force the members into engagement.

3. An electro-percussive welder comprising a plurality of electro members, magnetizable members rigidly secured thereto and means for magnetizing said members whereby an attracting force is established between the members.

4. An electro-percussive welder comprising a plurality of magnetizable members having centrally disposed pins having end portions of relatively small diameter; means for supporting one of the members; means for carrying electric current to each pin and means for magnetizing one of the members whereby the other member is attracted toward it.

5. An electro-percussive welder comprising a plurality of magnetizable members having centrally disposed pins, the end portions of which are of relatively small diameter, means for adjustably supporting one of the members, a conducting winding disposed about the end portions thereof and having one of its ends connected to the pin and the other to a source of electric current, and an electric conductor connected to the pin of the other member and to the current source.

6. An electro-percussive welder comprising a plurality of magnetizable members having centrally disposed electrodes, the end portions of which are of relatively small diameter, means for adjustably supporting one of the members, a conducting winding disposed about the end portions thereof and having one of its ends connected to the pin and the other to a source of electric current, an electric conductor connected to the pin of the other member and to the current source, and a condenser connected in parallel with the electrodes of both members.

7. A method of spot-welding that comprises disposing the articles to be welded upon an electromagnet having a welding electrode, placing a magnetizable member having a welding electrode upon the articles to be welded so that the electrodes are alined, connecting the electro-magnet and magnetizable member in a circuit containing a condenser and discharging the condenser, thus causing the articles to be heated at the points of contacts of the electrodes and the magnet to exert a strong attractive force upon the magnetizable member.

8. A method of welding wires that comprises securing the wires to a plurality of electrode members, fastening the electrode members to a plurality of magnetizable members, one of which has a current-carrying winding, connecting the electrode members in an electric circuit containing the winding, connecting a condenser in the circuit and in parallel with the electrode members, dropping one magnetizable member upon the other to cause an impact of the ends of the wires, and discharging the condenser through the circuit thus established to heat the wires and to energize the coil.

9. A method of welding wires that comprises securing the wires to the magnetizable members of an electro-magnet so that, when the ends of the wires are in engagement, the magnet members are in spaced relation, connecting the wires in an electric circuit with the magnet coil and a condenser, causing an impact between the ends of the wires and simultaneously discharging the condenser through them.

10. A method of welding wires that comprises mechanically forcing the ends of the wires together, applying an additional compressive force by means of an electric current and simultaneously heating the ends of the wires by the electric current.

In testimony whereof, I have hereunto subscribed my name this 19th day of Feb., 1919.

CHARLES LE G. FORTESCUE.